United States Patent
Frank

(10) Patent No.: US 9,416,274 B2
(45) Date of Patent: Aug. 16, 2016

(54) ASPHALT BINDER BLEND AND METHOD OF REJUVENATING AND SOFTENING ASPHALT CEMENT WITH BROWN GREASE

(71) Applicant: Robert E. Frank, Linwood, NJ (US)

(72) Inventor: Robert E. Frank, Linwood, NJ (US)

(73) Assignee: RAP Technologies, LLC, Linwood, NJ (US)

( * ) Notice: Subject to any disclaimer, the term of this patent is extended or adjusted under 35 U.S.C. 154(b) by 117 days.

(21) Appl. No.: 14/276,503

(22) Filed: May 13, 2014

(65) Prior Publication Data

US 2015/0329721 A1    Nov. 19, 2015

(51) Int. Cl.
*C08L 95/00* (2006.01)
*C08L 91/00* (2006.01)

(52) U.S. Cl.
CPC ............ *C08L 95/00* (2013.01); *C08L 91/00* (2013.01); *C08L 2555/64* (2013.01)

(58) Field of Classification Search
None
See application file for complete search history.

(56) References Cited

U.S. PATENT DOCUMENTS

| | | | | |
|---|---|---|---|---|
| 2,632,712 A * | 3/1953 | Lemmon | ................ | C08K 5/092 106/269 |
| 2,877,129 A | 3/1959 | Hardman | | |
| 7,384,562 B2 | 6/2008 | Rogers | | |
| 2003/0134036 A1* | 7/2003 | Hoad | ................ | C08K 9/08 427/212 |
| 2004/0221769 A1* | 11/2004 | Hokkirigawa | .... | C04B 35/62204 106/282 |
| 2010/0034586 A1* | 2/2010 | Bailey | ................ | C08L 91/00 404/75 |
| 2011/0197497 A1 | 8/2011 | Jiang | | |
| 2012/0030993 A1 | 2/2012 | Crosier et al. | | |
| 2014/0033951 A1* | 2/2014 | Ech | ................ | C08K 5/101 106/279 |

OTHER PUBLICATIONS

Jon Van Gerpen, "Used and Waste Oil and Grease for Biodiesel" Mar. 26, 2012; 5 pages.

* cited by examiner

*Primary Examiner* — Colin W Slifka
(74) *Attorney, Agent, or Firm* — St. Onge Steward Johnston & Reens LLC

(57) ABSTRACT

An asphalt binder blend includes a mixture of new and/or recycled asphalt cement and brown grease, wherein the brown grease has a free fatty acid (FFA) level greater than about 40% w/w, preferably greater than about 75% w/w. A volatile fraction of the brown grease may be removed, and the brown grease may be polymerized. An asphalt pavement material and a method of preparation thereof, wherein the asphalt pavement material includes a mixture of new and/or recycled aggregate and the asphalt binder blend including brown grease.

20 Claims, No Drawings

ASPHALT BINDER BLEND AND METHOD OF REJUVENATING AND SOFTENING ASPHALT CEMENT WITH BROWN GREASE

FIELD OF THE INVENTION

The invention pertains to the field of asphalt cement binders and blends, and, in particular, to the production of asphalt pavement materials using recycled asphalt pavement.

BACKGROUND OF THE INVENTION

Asphalt cement, also known as bitumen, is a sticky, black and highly viscous liquid or semi-solid form of petroleum. The primary use of asphalt cement is in road construction, where it is used as a glue or binder mixed with aggregate particles (for example, stone, sand, and gravel) to create asphalt concrete, or asphalt pavement. The asphalt cement content is typically around 5%-10% w/w of the entire mix, including the aggregate. Asphalt cement becomes hardened over time due to weathering and oxidation. Aged asphalt cement experiences a loss in ductility as it hardens, which can result in cracking and raveling of asphalt pavement structure. This effect can be explained by the change of chemical components of the aged asphalt cement. Asphalt cement is composed primarily of asphaltenes and maltenes. Asphaltenes are large, discrete solid inclusions, which are black in color and confer elastic properties. Maltenes in turn are composed of aromatic resins and saturated oils, which correlate to the viscous properties of the material. Aromatic resins are viscous polar compounds that disperse the larger asphaltene assemblies. They become fluid when heated and brittle at cold temperature. Saturated oils are clear, less viscous liquids that enable asphalt cement to flow especially at intermediate and low temperatures. Maltenes are lost during pavement service life due to three mechanisms: evaporation, exudation, and oxidation. Consequently the ratio of asphaltene to maltenes changes which leads stiffening of the aged asphalt cement.

Asphalt pavement is the most widely recycled material in the U.S., both by gross tonnage and by percentage. According to an industry survey conducted by the Federal Highway Administration and the National Asphalt Pavement Association released in 2011, more than 99% of the asphalt pavement removed each year from road surfaces during widening and resurfacing projects is reused as part of new pavements, roadbeds, shoulders and embankments. The reused asphalt pavement is also called recycled asphalt pavement/product (RAP). RAP can be used alone, but typically it is used with virgin (unused) aggregates. Since the asphalt cement in RAP is aged, it must be rejuvenated before reuse.

Asphalt rejuvenation is a process by which rheological properties of aged, hardened asphalt cement are restored to a point that the aged asphalt cement can be considered comparable to fresh asphalt cement. Asphalt rejuvenation is conducted by treating a RAP mix with recycling agents, which soften the aged asphalt cement in the mix and restore its flexibility. Recycling agents are also called softening agents, or rejuvenators. To be suitable for rejuvenating asphalt, a material must have a high flash point, be easy to disperse, have a low volatile loss during hot mixing, resist hardening, and be uniform from batch to batch. Ideally the material should have few or no asphaltenes in order to efficiently correct the asphaltene:maltene ratio.

SUMMARY OF THE INVENTION

The invention provides an asphalt binder blend suitable for use in producing asphalt pavement materials and other uses. The asphalt binder blend includes a mixture of asphalt cement and brown grease, wherein the brown grease has a free fatty acid level greater than about 40% w/w, preferably greater than about 75% w/w. The asphalt cement may comprise fresh or recycled (or waste-derived) asphalt cement. The blend may additionally include black grease, yellow grease, polar viscous materials, odor masking agents, and/or recycling agents. The recycling agents may include, but are not limited to, tall oil derivatives, aromatic extracts, petroleum oils, waste petroleum oils, refined waste engine oil byproducts, pyrolysis residues, and organic oils. The brown grease may be treated brown grease in that a volatile fraction of the brown grease may be removed, and/or the brown grease may be polymerized, before or after blending, and further, the blend may be foamed.

The invention also provides an asphalt pavement material comprised of a mixture of asphalt pavement components and a method of producing the asphalt pavement material. The asphalt pavement components comprise aggregate, asphalt cement and brown grease, wherein the brown grease has a free fatty acid (FFA) level greater than about 40% w/w, preferably greater than about 75% w/w. The aggregate may comprise recycled asphalt pavement material, at about 40 percent to about 100 percent by weight of the total asphalt pavement material. The asphalt cement may comprise aged asphalt cement in the recycled asphalt pavement material and/or added asphalt cement, wherein the added asphalt cement may include fresh or recycled (or waste-derived) asphalt cement. The asphalt pavement components may additionally include black grease or yellow grease, polar viscous materials, odor masking agents, and recycling agents. The recycling agents can include, but are not limited to, tall oil derivatives, aromatic extracts, petroleum oils, waste petroleum oils, refined waste engine oil byproducts, pyrolysis residues, organic oils, and combinations thereof. A mixture of the asphalt cement and brown grease may be foamed, a volatile fraction of the brown grease may be removed, and/or the brown grease may be polymerized before or during mixing of the asphalt pavement components.

DETAILED DESCRIPTION OF THE INVENTION

The invention provides methods for the use of brown grease for asphalt related processes, including rejuvenating aged asphalt pavement material. It also provides asphalt cement binder blends comprising brown grease, and methods of preparation thereof.

As used herein, brown grease refers to grease consisting essentially of animal fats, waste vegetable oils, and grease ("FOG"), which are composed of triglycerides and free fatty acids (FFA). According to a 1998 Department of Energy study, it was estimated that each year about 13 pounds of brown grease is generated per capita in the United States. With age, triglycerides of vegetable oils and animal fats become partially or completely hydrolyzed by water and bacteria action into free fatty acids ("FFAs"), glycerol, monoglycerides, and diglycerides. As a result, brown grease contains a significant amount of FFAs, ranging from about 15 wt % to 100 wt %. In contrast to brown grease, yellow grease refers to waste vegetable oil or used organic grease with less than 15% FFA.

Brown grease is typically recovered from trap grease collected by pumper trucks from grease traps and interceptors of commercial and residential kitchens. In many areas, pumper trucks dispose of collected trap grease at regional sewage treatment plants where it is comingled with septic grease (also known as black grease). As a result, brown grease is sometimes contaminated by water, food debris, free acids, metals and illegally dumped chemicals such as dioxins and other carcinogens. Under anaerobic or aerobic conditions, a fermentation process by microbial systems can generate hydrogen sulfide and other volatile sulfur derivatives, which may cause brown grease to have a foul or mal-odor. Brown grease tends to solidify at temperatures around 5-10 degrees Celsius. Due to the high FFA content and free acids, brown grease is acidic, generally having a pH of 3 to 5.

Numerous processes designed to recover brown grease from trap grease have been disclosed in patent literature. Most involve either inertial separation of grease from water by centrifuge, gravimetric separation in heated settling tanks or skimmers. On occasions chemicals aid the separation and recovery process. Most facilities require acid neutralization, for example by alkali treatment, to achieve neutral pH required for sanitary sewer discharge. Alkali treatment early in recovery process improves the quality of brown grease by reducing free acid. Quality and consistency of recovered brown grease can vary significantly by process, processor and seasonally.

Brown grease is often considered unsuitable for re-use in most bio-diesel applications unless has been chemically processed to convert triglycerides into fatty acid methyl esters (FAME). But the technical and capital requirements for treating brown grease are cost-prohibitive and currently represent an insurmountable barrier to widespread commercialization. Issues that heretofore generally discouraged the reuse of brown grease for industrial applications include its foul odor, high level of FFAs (up to 98% FFAs), and contamination with food, trash, and water. To date, brown grease has not been used in the asphalt pavement industry. However, it has been discovered that brown grease is an effective softening and recycling agent for use in asphalt processes.

Unless otherwise defined, all technical and scientific terms used herein have the same meaning as commonly understood by one of ordinary skill in the art to which this invention belongs. Any preferred embodiment of the invention that will be described in connection with a particular aspect of the invention shall also apply to the other aspects of the invention. The plural forms also include the singular unless the context clearly dictates otherwise. All percentages are a weight percentage based on the total weight, unless stated otherwise.

Asphalt cement, asphalt binder and bitumen are used interchangeably in the application to refer to the sticky, black and highly viscous liquid or semi-solid form of petroleum. Asphalt blend or asphalt binder blend refers to an asphalt cement/binder mixed with other components and/or modifiers. Asphalt concrete is used to mean asphalt cement/binder or asphalt blend mixed with aggregates. RAP (Recycled/Reclaimed Asphalt Pavement/Product) reused/recycled asphalt pavement, and reused/recycled asphalt concrete are used interchangeably to mean reclaimed/recycled aged asphalt concrete/pavement.

In a first aspect, the invention provides a recycling agent for the rejuvenation of asphalt mixes containing recycled asphalt pavement (RAP), wherein the recycling agent comprises brown grease.

It is discovered that brown grease can be used as a rejuvenating agent for RAP and can effectively soften aged asphalt cement/binder contained in RAP to restore its flexibility. Advantageously, it has been further discovered that brown grease provides a balanced softening of the aged asphalt cement in RAP. The term "balanced softening," means that brown grease softens aged asphalt cement at high, low, and intermediate temperatures (e.g., at 64, −22, and 25 degrees Celsius for mid Atlantic region), and the softening at the three temperatures is well balanced. As such, the rejuvenated RAP will have the softness and workability at a temperature range from −22 to 64 degrees Celsius. In contrast, if a rejuvenating agent is more effective in softening at high temperature than at low temperature, the rejuvenated RAP will be prone to rutting under normal conditions; and if a recycling agent is more effective in softening at intermediate temperature than at high temperature, then the suitable use of the rejuvenated RAP will be limited to intermediate temperature range.

One advantage of the present invention is that the brown grease recycling agent can be used for softening a conventional asphalt mix having any level of RAP content, from 0% to 100% RAP. It is particularly suitable for rejuvenating a high RAP mix, having between 40% and 100% RAP.

The asphalt rejuvenation process employing brown grease as a recycling agent may be performed in accordance with other rejuvenation conditions and processes commonly known to a person skilled in the art. In particular, the brown grease can be employed in hot-mix asphalt processes comprising:

(a) heating recycled asphalt pavement (RAP) material to form hot-mix asphalt;

(b) optionally, adding virgin aggregates and/or additional asphalt cement/binder, such as fresh asphalt cement or recycled asphalt cement/binder;

(c) adding a recycling agent into the hot-mix asphalt to achieve desired properties of the rejuvenated asphalt, wherein the recycling agent includes brown grease; and (d) mixing the recycled asphalt payment material, aggregates, asphalt cement and recycling agent.

In the above processes, the steps can be rearranged and/or subdivided, for example steps (b) and (c) may be reversed.

Because of its superior softening properties, only a relatively small amount of brown grease is required to achieve a desired degree of softening of RAP. Preferably, brown grease is used in an amount of about 5 to 12% w/w, of the RAP binder, where the weight of the RAP binder is determined by analyzing a sample of the RAP. To increase the total content of asphalt binders, fresh and/or recycled asphalt cement/binder may also be added to further improve the quality of the final product or mixture.

Nearly all qualities of brown grease may be used in the invention. Brown grease may have from 15% to 98% FFAs; preferably, greater than 40% FFAs; even more preferably, greater than 75% FFAs. Suitable brown grease may include trap grease and/or black grease, and the brown grease may be mixed with yellow grease. Brown grease and yellow grease can be commingled at their origin, during collection, processing, or at a terminal prior to distribution. A mixture of brown grease and yellow grease can be used directly for rejuvenating aged asphalt cement without isolating brown grease from the mixture. Preferably, used cooking oils from commercial kitchens are used as a source of brown grease. Used cooking oils are cleaner than the FOG from other sources. They can also be subjected to quantitative testing prior to distribution to ensure that each batch has relatively consistent amount of key elements (e.g., FFAs). Using a consistent quality of brown grease in asphalt processes means less variations of the processes. In one embodiment, a used cooling oil contains about 75% w/w of FFAs is used in the processes.

All brown grease has measurable amounts (1 to >5%) of other materials know in the art as MIU (i.e., moisture, impurities and unsaponifiables). One advantage of the invention is that brown grease can be used directly without pre-treatment to remove or reduce MIU levels to below 5% as required for bio-diesel production. For example rejuvenating processes and other asphalt processes typically involve high temperature. As such, water contamination is not an issue, as water will evaporate during the process.

The process in accordance with the invention can also tolerate contaminants in brown grease, including animal fat, hydrogenated/saturated fats and oils, and/or other similar contaminants. These components would normally cause cold flow issues at low or ambient temperature. However, since asphalt mixing is often conducted at elevated temperature, these fats and oils are softened during the process and are effectively mixed with asphalt aggregates to form uniform hot-mix asphalt. These fats and oils also have softening effects on the asphalt binders. As such, the rejuvenation performance of brown grease is enhanced by these otherwise contaminants.

Another reason that brown grease can be used without pre-treatment is that asphalt cement immobilizes contaminants and thus removes them from environment. Consequently, brown grease having micron size solid contaminations, as well as brown grease having chemical contaminations, may be used in the inventive process. By trapping the chemicals and other contaminations of brown grease in asphalt cement, the invention provides a green solution to brown grease's disposal and reuse.

While brown grease can be used to rejuvenate age hardened recycled binder in RAP or shingle materials without pre-treatment as disclosed above, the quality and thus the performance of brown grease is improved by removal of small quantities of volatile fractions of organic compounds contained in the brown grease. The volatile fractions of organic compounds are typically alcohols, and aldehydes generated during a fermentation process by microbial systems, as described before; and light oils ($C_{12}$ to $C_{16}$). Removal of the alcohols, aldehydes and light oils not only reduces mal-odor but also reduces or eliminates mass loss caused by heating during asphalt manufacturing. The exact quantity of the alcohols, aldehydes and light oils removed is not critical to invention but it is expected to be about 6 to 10% w/w, and preferably about 8% w/w, by weight of the brown grease.

The volatile fractions can be removed from the brown grease simultaneously or sequentially by a number of methods including fractional distillation. A fractional distillation system would operate at a temperature range between about 85 and about 120 degrees Celsius and under a slight vacuum of about 10 mm mercury below one atmosphere, to distill away and collect the alcohols, aldehydes and light oils, either separately or together. The alcohols, aldehydes and light oils evaporated or separated can be condensed and collected for use in other applications. For instance, light oils having a carbon chain between $C_{16}$ to $C_{18}$ may be used as fuel. After distillation, the resulting brown grease contains no or less volatile fraction components.

Brown grease can also be modified by polymerization before it is used to recycle or soften RAP, or before blending with asphalt cement.

As stated before, brown grease includes free fatty acids with some triglyceerides. Many of the fatty acids contain at least one unsaturated carbon bond, meaning that two adjacent carbon atoms share a double bond. For instance, FFA with at least one double bond accounts for between 50% and 75% of FFA in brown grease. These double bonds make the molecules prone to polymerization with the aid of polymerization initiators. Moreover, each fatty acid may have more than one double bond, typically at the chain positions of C18:2 and C18:3, which provides a potential for a high degree of polymerization. As such, brown grease is well suited to generate polymer complexes of any molecular weight with an appropriate polymerization system designed and engineered to stop polymerization at a desired level. In this regard, brown grease can be used as a polymer source for asphalt binder, in addition to being used as a recycling agent.

Brown grease can only be polymerized partially because not all the molecules in brown grease are suitable for polymerization. Moreover, it is possible that not all the double bonded carbon atoms in brown grease are accessible for polymerization. Therefore, the terms "polymerized" and "polymerization," as used in this application with respect to brown grease, mean that only a portion of the molecules in the brown grease are polymerized, and the brown grease still has ample monomers, either saturated or unsaturated to act as softening agent of the stiff aged RAP binder.

As a result of the partial polymerization, the physical properties of brown grease are modified. For instance, brown grease tends to lose fluidity as the degree of polymerization increases. Brown grease having 50% of polymer content becomes gel like. For material handling reasons, brown grease having 40% polymer content is preferred.

When brown grease is used both as a recycling agent and as a polymer source, an optimum degree of polymerization of brown grease may be as much as 50%. In a blended system of polymerized brown grease and RAP binder, the polymer content may be about 0.5% to about 8% w/w of the total binder, preferably between 3% and 8% w/w, depending on the pavement application.

Polymerized brown grease produces a hybrid product of polymer and monomer which is useful for optimizing the rejuvenating process of age hardened RAP binders. Without wishing to be bound by theory, it is believed that the polymer complexes may improve the intermediate temperature flexibility of the RAP binder, consequently the RAP binder is more resistant to cracking and rutting.

The polymerization process may take place at an elevated temperature, and optionally at elevated pressures. Radical initiators may be added to brown grease to initiate polymerization. Polymerization conditions directly affect the molecular weight ("Mw"), molecular weight distribution and other properties of the polymers obtained. An increase of temperature will cause faster reactions and lower Mw polymers. Higher pressure increases the propagation and inhibits the termination, and therefore forms higher Mw polymers. The more initiator radicals, the more chains, and lower Mw polymers.

The temperature suitable for the polymerization of brown grease can be anywhere from slightly above room temperature to about 300 degrees Celsius. The pressure suitable for the polymerization can be anywhere from about 1 atm to about 1,000 atm. The initiators may include peroxides, AIBN (2,2-azo-bis-isobutyronitrile), or other radical initiators which decompose upon heating. Preferably, the initiators are peroxides, such as benzoyl peroxide, hydrogen peroxide, and t-butyl peroxide. Even more preferably, the initiator is hydrogen peroxide.

One advantage of the polymerization process of brown grease is that the addition of solvent is optional. Brown grease contains substantial amounts of liquid or semi-liquid unsaturated molecules such that the polymerization can be conducted by simply adding an initiator to brown grease followed by heating (a/k/a, bulk polymerization or mass polymerization). Because of the highly exothermic nature of free radical addition polymerization, traditional bulk polymerization often has a heat transfer problem. As a result, the polymers obtained from the traditional bulk polymerization have very low Mw and a broad Mw distribution. However, bulk polymerization of brown grease does not have a heat transfer problem because there are plenty of non-reactive liquid or semi-liquid components, which help to dissipate the heat generated during the process.

In a second aspect of the invention, brown grease may be used in asphalt pavement production processes using solely virgin aggregate, to soften or otherwise alter the properties of fresh asphalt cement and/or recycled asphalt cement. In particular, brown grease may be blended with fresh and/or recycled asphalt cement or binders prior to or during mixing with aggregates to lower the PG Grade. For example at a ratio of about 5 to about 8% w/w by weight of the asphalt cement, brown grease will drop the PG grade of fresh asphalt cement 6 degrees Celsius.

Brown grease can also be used in combination with fresh or recycled asphalt cement, or blends of fresh and recycled asphalt cement. One advantage is that, when brown grease is added, the blend can tolerate a higher percentage of recycled asphalt cement while maintaining desired workability, fatigue cracking resistance and low temperature flexibility. For example, without adding brown grease, up to 20% w/w of recycled asphalt cement derived from recycled/waste asphalt shingles (RAS), by weight of the total binder, can be added to a pavement mixture. However, with the addition of brown grease, more than 20% w/w of the recycled asphalt cement, by weight of the total binder, can be used.

Brown grease can be blended with asphalt cement alone or in combination with other agents and modifiers. For instance, tall oil derivatives or other known recycling agents may be used in addition to brown grease. The tall oil derivatives and other recycling agents may include, but are not limited to, aromatic extracts, base oils, petroleum oils, waste engine oils, waste petroleum oils, waste engine oil bottoms, refined waste engine oil byproducts, pyrolysis residues, and organic oils. Additionally or alternatively, modifiers such as polymeric modifiers and ground tire rubber can be added to an asphalt blend containing brown grease.

If desired, an odor masking agent may be used with brown grease. For example, the agent can be added to an asphalt blend containing brown grease or can be added to an asphalt mix before, during or after introduction of brown grease.

In another embodiment, brown grease and polar viscous materials are blended together for improving brown grease workability, in particularly, pumpability at ambient temperature.

Pumpability refers to the ability of material to flow through a conduit by pressure from a pump. Due to the tendency of brown grease to solidify at ambient temperatures in range of 70 F, pumping of brown grease is typically conducted at an elevated temperature. However, serious handling problems result if a process upset or other conditions causes the product to cool and solidify in unheated piping. A blend of brown grease and polar viscous materials in accordance with the present invention provides a solution to the issue.

The polar viscous materials used herein refer to the materials that are both polar (from a molecular point of view) and viscous (from a physical property point of view). Such materials are very compatible to the components of brown grease. The polar materials, be they asphalt cement or other polar compounds, have both acid and base radicals attached to their molecular assemblies.

Without wishing to be bound by theory, it is believed that the blend of brown grease and the polar viscous materials prevents the hydrogenated fatty acids from assembling at lower temperatures and which in turn improves the flow ability and pumpability of the brown grease.

Suitable polar viscous materials include, but are not limited to, asphalt cement, waste engine oil bottoms (re-refinery residue), and naphthenic aromatic oils. The polar viscous material is used in an amount from 5 to 75% w/w, preferably from 10 to 25% w/w, and even more preferably, about 20% w/w, by weight of the blend. The blend may be premixed and stored for later use.

The invention provides asphalt binder blends suitable for various asphalt processes over a range of performance grades (PG), and methods of preparation thereof. As set forth above, the asphalt binder blends can comprise fresh or recycled asphalt cement, brown grease for softening the asphalt cement, and various agents and modifiers. The asphalt binder blends can be designed to meet the requirements of a desired PG.

The performance grades (PG) system is a method of characterizing asphalt binder suitability for different climate regions. For example, a PG 64-22 binder, which is commonly used for virgin asphalt mixes in Middle America, means that maximum expected regional pavement temperature is 64 degrees Celsius and minimum expected temperature is −22 degrees Celsius. Northern regions require softer binders to tolerate cold harsh winters without cracking and southern regions stiffer binders to endure summer heat without rutting.

No single PG binder fits all asphalt needs. Therefore, multiple PG grades of binders are often prepared or made available in order to suit different requirements. RAP content and stiffness, climate conditions, and anticipated traffic levels are all factors considered in determining a suitable PG binder.

Methods of preparing a range of PG of fresh binder blends comprise: determining desired PG properties of an asphalt binder blend; providing a base stock of binder comprising fresh and/or recycled asphalt cement/binder; and adding and blending a modifier to the base stock of binder in an amount until the binder blend achieves the desired properties, wherein the modifier comprises brown grease. In some embodiments, the modifier may further comprise polymeric modifiers and/or ground tire rubber modifiers. Using this method, the invention provides multiple performance grades of binders from a common binder base stock.

Instead of preparing stocks of multiple PG of asphalt binders, an in situ (i.e., on-site) modification can be made to asphalt binder in order to produce asphalt having desired PG properties. The in situ method comprises the steps of: determining desired PG properties of an asphalt product; adding and mixing a modifier to an asphalt binder in an amount sufficient to achieve the desired properties, wherein the modifier comprises brown grease; and mixing the modified asphalt binder with virgin or recycled aggregate. In some embodiments, the modifier may further comprise polymeric modifiers and/or ground tire rubber modifiers, or other modifiers or additives.

The present invention provides a process of using brown grease to form asphalt cutbacks for use in various asphalt processes. In this aspect, brown grease functions as flux oil to soften the asphalt cement, to improve the penetration, and to decrease the viscosity of the asphalt.

Asphalt cutbacks have a lower melting point than that of asphalt, which allow the asphalt process to be conducted at much lower temperature than the traditional hot-mix asphalt process. Asphalt cutbacks can be used to produce cold applied compositions for road repair as well as hot applied compositions for priming surfaces prior to the application of hot asphalt cement. There are generally three types of cutbacks based on the cure time. One type is rapid cure (RC) cutback in which high volatility of solvents, such as naphtha or gasoline, are added to prepare the cutback. RC cutback is suitable for tack coating or surface treatment. Another type of cutback is medium cure (MC) cutback in which moderate volatility solvents, such as kerosene, are added to prepare the cutback. MC cutback is also known as stockpile patching mix. A third type of cutback is slow cure (SC) cutback in which low volatility and low viscosity oils are added to prepare the cutback. SC cutback is suitable for prime coating and dust control.

According to the invention, brown grease can be used to form an asphalt cement cutback, of RC, MC, or SC type, by blending brown grease with fresh and/or recycled asphalt cement/binder and the respective petroleum solvents. As a result of the use of brown grease, the amount of the respective petroleum solvents needed may be reduced, and the resulting cutback has an improved softness and flowability.

In another aspect, the present invention provides a process of using brown grease to form an asphalt emulsion.

Asphalt emulsion is formed by emulsifying asphalt cement with water and a small quantity of chemical emulsifiers that promotes and stabilizes the emulsion. Converting asphalt cement into an emulsion form is a way to lower the process temperature of asphalt. The asphalt emulsion can be mixed with aggregates to form asphalt cement or can be used directly in road construction by spraying it onto a road surface followed by a layer of crushed rock, gravel or crushed slag, or for other suitable uses.

According to the invention, the process comprises the steps of adding brown grease, water and a chemical emulsifier to asphalt cement and mixing at high pressure to form an emulsion.

Preferably, the chemical emulsifier is a cationic emulsifier because it has a good affinity with brown grease. The emulsion process may be performed in accordance with the procedures commonly known to a person skilled in the art. A very storable and stable asphalt emulsion is obtained when brown grease is used as an additive. Without wishing to be bound by theory, it is believed that brown grease, in addition to softening the asphalt, also facilitates the mixing of water and asphalt because brown grease's molecules have acid groups, which have an affinity to water molecules, and long hydrocarbon chains, which are compatible with asphalt molecules.

In another aspect, the invention provides a process of using brown grease for improving asphalt foaming processes.

The purpose of asphalt foaming is to make it easier for asphalt to disperse into aggregate, particularly cold granular material at ambient temperature. In a steam-based asphalt foaming process, a small quantity of cold water (usually with a mass ratio of 1% to 5% to the asphalt binder) and compressed air are injected into hot asphalt (e.g., at 140 to 170 degrees Celsius) to produce foamed asphalt containing numerous air/steam micro bubbles. As a result, the volume of the binder, and accordingly the surface area per unit mass, has been increased temporarily, which makes it easier for the asphalt to be dispersed into granular materials at ambient temperature.

In another aspect of the invention, brown grease is added to asphalt cement, followed by a suitable asphalt foaming process. The resulting foamed asphalt cement binder can be used to rejuvenate RAP or in virgin asphalt mixes, for example in the processes disclosed above. In this embodiment, brown grease softens the hardened RAP binder, improves the foam quality, and improves the durability of mixtures produced.

In another aspect, the present invention provides storable asphalt compositions, particularly useful for small scale road repair. Storable asphalt compositions must be storage stable and also maintain reasonable workability at room temperature. Workability is the property of asphalt mixtures which allows the production, handling, placing and compaction of asphalt mixtures with minimal energy consumption. Workability at room temperature is important because the asphalt compositions are directly applied to the degraded road surfaces, in so called cold applications.

In accordance with the invention, the storable asphalt composition comprises brown grease and asphalt cement, wherein the brown grease is in a high level, from 40 to 60% w/w relative to the asphalt cement. The high level of brown grease maintains the workability of the asphalt mixture at room temperature after long term storage. Preferably, waste derived asphalt cement is used to prepare storable asphalt compositions. Alternatively, fresh asphalt cement, or a combination of fresh and waste derived asphalt cement can also be used. The storable asphalt compositions can be prepared by various processes known in the art.

As can be appreciated, the various forms, modifications, treatments and blends of brown grease disclosed herein can be used alternatively, or in any combination, in any suitable asphalt process, including processes using recycled asphalt products or new products, and combinations thereof.

It should be understood, of course, that the specific forms of the invention herein illustrated and described is intended to be representative only, as certain changes may be made therein without departing from the clear teachings of the disclosure. Accordingly, reference should be made to the following appended claims in determining the full scope of the invention.

What is claimed:

1. An asphalt binder blend, comprising:
a mixture of asphalt cement and brown grease;
wherein the brown grease comprises animal fats, waste vegetable oils, and grease.

2. The asphalt binder blend of claim 1,
wherein the brown grease has a free fatty acid level greater than about 40% w/w.

3. The asphalt binder blend of claim 2,
wherein the brown grease has a free fatty acid level greater than about 75% w/w.

4. The asphalt binder blend of claim 1,
wherein the asphalt cement comprises fresh or recycled asphalt cement.

5. The asphalt binder blend of claim 1, further comprising:
black grease or yellow grease.

6. The asphalt binder blend of claim 1, further comprising:
a polar viscous material.

7. The asphalt binder blend of claim 1, further comprising:
an odor masking agent.

8. The asphalt binder blend of claim 1, further comprising:
a recycling agent.

9. The asphalt binder blend of claim 8,
wherein the recycling agent is selected from the group consisting of tall oil derivatives, aromatic extracts, petroleum oils, waste petroleum oils, refined waste engine oil byproducts, pyrolysis residues, and organic oils.

10. The asphalt binder blend of claim 1,
wherein the mixture is foamed.

11. The asphalt binder blend of claim 1,
wherein a volatile fraction is removed from the brown grease.

12. The asphalt binder blend of claim 1,
wherein the brown grease is polymerized.

13. The asphalt binder blend of claim 1,
wherein the brown grease has a pH of about 3 to about 5.

14. An asphalt pavement material, comprising:
a mixture of asphalt pavement components;
wherein the asphalt pavement components comprise aggregate, and the asphalt binder blend of claim 1.

15. The asphalt pavement material of claim 14, wherein the brown grease has a free fatty acid level greater than about 40% w/w.

16. The asphalt pavement material of claim 14, wherein the aggregate comprises recycled asphalt pavement material at about 40 percent to about 100 percent by weight of the asphalt pavement material; and wherein the asphalt cement comprises aged asphalt cement in the recycled asphalt pavement material.

17. The asphalt pavement material of claim 14, wherein the asphalt cement further comprises fresh asphalt cement.

18. The asphalt pavement material of claim 14, wherein the asphalt cement comprises recycled asphalt cement.

19. The asphalt pavement material of claim 14, wherein a volatile fraction of the brown grease is removed.

20. The asphalt pavement material of claim 14, wherein the brown grease is polymerized.

* * * * *